(12) United States Patent
Kavipurapu (10) Patent No.: US 12,242,785 B2
(45) Date of Patent: Mar. 4, 2025

(54) SOFTWARE TO INDUSTRIAL DEVICE INTERFACE

(71) Applicant: Ectron Corporation, San Diego, CA (US)

(72) Inventor: Gautam Kavipurapu, San Diego, CA (US)

(73) Assignee: Ectron Corporation, San Diego, CA (US)

( * ) Notice: Subject to any disclaimer, the term of this patent is extended or adjusted under 35 U.S.C. 154(b) by 527 days.

(21) Appl. No.: 17/655,949

(22) Filed: Mar. 22, 2022

(65) Prior Publication Data

US 2022/0309219 A1    Sep. 29, 2022

Related U.S. Application Data

(60) Provisional application No. 63/165,003, filed on Mar. 23, 2021.

(51) Int. Cl.
*G06F 30/347* (2020.01)
*G06F 9/30* (2018.01)
*G06F 30/331* (2020.01)

(52) U.S. Cl.
CPC ........ *G06F 30/347* (2020.01); *G06F 9/30036* (2013.01); *G06F 30/331* (2020.01)

(58) Field of Classification Search
CPC ... G06F 30/347; G06F 30/331; G06F 9/30036
(Continued)

(56) References Cited

U.S. PATENT DOCUMENTS

| 6,704,816 B1 * | 3/2004 | Burke | G06F 15/7867 |
| | | | 708/231 |
| 8,639,487 B1 * | 1/2014 | Ezer | G06F 30/327 |
| | | | 716/102 |

(Continued)

FOREIGN PATENT DOCUMENTS

| CN | 112580295 A | * 3/2021 | ........... G06F 30/327 |
| CN | 117131813 A | * 11/2023 | |

(Continued)

OTHER PUBLICATIONS

International Search Report and Written Opinion for Application No. PCT/US2022/021433 dated Aug. 9, 2022.

*Primary Examiner* — Suresh Memula
(74) *Attorney, Agent, or Firm* — Knobbe, Martens, Olson & Bear, LLP (57) ABSTRACT

Systems and methods are described for controlling or monitoring a wide variety of target hardware, which may use various interfaces and protocols, via non-customized software, without requiring additional software to interface between the non-customized software and the target hardware. An application repository can include a variety of software applications available to end users. An end user may request one or more such applications, and specify target hardware controlled or monitored by the applications. The app repository can then generate a hardware configuration template, corresponding to a configuration of a field-programmable hardware layer on a bridge device of the end user, which routes data between inputs and outputs of the target hardware and a memory on the bridge device. The template and applications can then be provisioned on the bridge device, such that the applications can execute to control and monitor the target hardware via interaction with the memory.

20 Claims, 7 Drawing Sheets

(58) Field of Classification Search
USPC .......................................................... 716/116
See application file for complete search history.

(56) References Cited

U.S. PATENT DOCUMENTS

| | | | | |
|---|---|---|---|---|
| 8,689,121 | B2 * | 4/2014 | O'Riordan | ................ G06F 8/34 |
| | | | | 715/764 |
| 8,719,753 | B1 * | 5/2014 | Chow | ................ H01L 25/0657 |
| | | | | 716/139 |
| 8,887,121 | B2 * | 11/2014 | Ravindran | ................ G06F 8/20 |
| | | | | 717/109 |
| 2015/0109024 | A1 * | 4/2015 | Abdelfattah | ... H03K 19/017581 |
| | | | | 326/41 |
| 2018/0284747 | A1 * | 10/2018 | Cella | ................ G05B 19/41865 |

FOREIGN PATENT DOCUMENTS

| | | | |
|---|---|---|---|
| CN | 117608686 A | * | 2/2024 |
| WO | WO 2022/204213 A1 | | 9/2022 |

* cited by examiner

SOFTWARE TO INDUSTRIAL DEVICE INTERFACE

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

Traditional data centers often focus on providing compute resources, like processing power. However, as computing systems have advanced, it has become apparent that these systems can be applied in contexts other than traditional data processing. For example, computing systems can be co-located with industrial machinery to facilitate monitoring and control of such machinery. These computing systems are generally programmable, and thus can replace traditional non-programmable control devices. When connected to a network, like the global Internet, these computing systems are sometimes referred to as "Internet-of-Things," or "IoT" device—a term that generally refers to a network-attached device with an alternative primary function, other than logical computation. For example, an IoT device may control or monitor a physical process.

Many items of equipment are not IoT devices. That is, some equipment can lack the functionality to communicate over a given network, like the Internet. Moreover, it is often non-trivial to enable such communication in such devices. For example, such devices may include a communication bus to transmit information, but which requires a specific protocol that cannot be changed due to physical configuration of the device. Due to the wide variety of such protocols, along with the wide variety of physical standards for devices, it can be non-trivial to develop interfaces to connect such devices to networks. Often, such interfaces must be customized on a per-device basis, inhibiting large-scale solutions.

DETAILED DESCRIPTION

Generally described, aspects of the present disclosure relate to facilitating communication between software executing on a processor and target hardware, such as industrial machinery, that may utilize a variety of communication protocols. More specifically, aspects of the present disclosure relate to enabling such communication without requiring customization of the software to the particular target hardware, by providing a field-programmable hardware layer between the processor and the target hardware that enables communication between the software and the target hardware without customization of the software. For example, the software may implement various desirable functionalities for an industrial setting, such as process control or monitoring. The target hardware control or monitored by the software may vary across applications, and it may be difficult or impossible to account, within the software, for the wide variety of physical configurations of such target hardware. Moreover, it may be inefficient to attempt to account for such a variety of configuration in software, as software translation of protocols may result in high computational complexity, reducing the effectiveness of the processor implementing the software, or causing latency in control and monitoring operations. Industrial processes may be especially sensitive to such latency. Embodiments of the present disclosure address these problems by providing for a customizable hardware layer between a processor executing software and the target hardware, which layer can be configured to translate, via hardware circuitry, between inputs and outputs of the target hardware and inputs and outputs of the processor. This hardware layer can be field programmable. For example, it may be implemented via a field programmable gate array (FPGA). The FPGA may be configured to "wire up" inputs and outputs of target hardware to corresponding inputs and outputs of a processor, such that software executing on the processor need not be customized to the inputs and outputs of the target hardware. In this manner, creation and distribution of such software is simplified, and such software is enabled to interact with a wide variety of target hardware, despite varying protocols supported by such hardware, varying physical configurations of the hardware, or the like.

Further, embodiments of the present disclosure relate to a distribution network for software, which distributes software along with instructions for configuration of the field-programmable hardware layer according to target hardware. For example, the distribution network may include an "application repository" or the like, with software intended to carry out various processes such as industrial control and monitoring. Each item of software may be intended to be executed on a given processor (or one of a number of similarly configured processors, such as an ARM architecture processor), but may not be customized to any given target hardware. To facilitate communication of the software and the target hardware, the distribution network may enable an end user to download the software along with a template for configuring a field-programmable hardware layer according to target hardware of the end user. For example, the end user may notify the distribution network of the specific configuration of the target hardware (e.g., specifying a brand, device, serial number, protocol, physical port type, etc.), and the distribution network may generate a template for a field-programmable hardware layer that, when applied to that field-programmable hardware layer, enables the software to communicate with the target hardware. Thus, end users may be enabled to execute such software to control or monitor the target hardware. Similarly, software developers are enabled to distribute their software to end users, without requiring that the software be customized to each end user.

As will be appreciated by one skilled in the art, the software disclosed herein— once in communication with target hardware—may carry out a wide variety of functionalities with respect to that hardware. For example, the software, when executed on a computing device with network communication capabilities, may transmit information obtained from target hardware over a network, effectively enabling IoT functionality with respect to the target hardware. The software may further implement various control strategies to increase the operational capacity, efficiency, or accuracy of target hardware. For example, the software may implement machine learning (ML) algorithms to adjust functionality of the hardware and realize these improvements. Effectively, embodiments of the present disclosure enable target hardware, which may otherwise be limited in its functionality due to use of non-customizable inputs and outputs, to realize the wide range of beneficial functionalities provided by computing systems.

The embodiments disclosed herein provide a number of advantages over alternative systems. For example, it may be possible to enable software executing on a standardized processor to interface with target hardware by providing a software interface (e.g., to provide translation between communication protocols) implemented on a microcontroller. One skilled in the art will appreciate that there are numerous advantages to interfacing via a field-programmable hardware layer, rather than using a software interface. For example, field-programmable hardware layers typically have significantly improved timing, connectivity, parallelism, and bandwidth relative to microcontrollers. These advantages are often critical, for example in industrial settings. Thus, use of a field-programmable hardware layer to facilitate interaction between software (executing on a processor) and target hardware may enable use of that software in situations where a microcontroller interface would not be appropriate.

Moreover, embodiments of the present disclosure can significantly reduce or eliminate the need for customization on the part of an end user. Illustratively, embodiments of the present disclosure may utilize a standardized 'bridge' device, which includes a processor, network connectivity to a wide or global area network (e.g., the Internet), and a field-programmable hardware layer with a variety of physical input and output ports. An end user wished to control or monitor target hardware, like industrial equipment, may connect the target hardware to the inputs and outputs of the bridge device, and then access a centralized software repository for the bridge device. The end user may identify software within the repository that carries out a desired functionality, and specify to the repository the particular target hardware to be monitored or controlled. The repository may then generate a template, representing a hardware configuration to be implemented on the field-programmable hardware layer of the bridge device, based on the inputs/outputs of the software and the inputs/outputs of the target hardware. For example, the repository may maintain, for each available item of software, metadata indicating particular inputs/outputs of the software (e.g., as the data expected on certain pins of a microprocessor executing the software). Similarly, the repository may maintain metadata for various target hardware specifying the inputs/outputs of the hardware, or the end user may specify those inputs/outputs. The repository may then utilize an FPGA compiler or other software to generate a hardware template for the field-programmable hardware layer. Once generated, the end user may receive both the software and the corresponding template from the repository, which may be implemented on the bridge device. For example, the bridge device may use the template to configure the field-programmable hardware layer, such that the field-programmable hardware layer implements hardware to connect or convert inputs/outputs of the target hardware to inputs/outputs of the software when executed on the processor of the bridge device. The bridge device may then execute the software on the processor, such that the bridge device is configured to implement functionality of the software to monitor or control the target hardware. Thus, embodiments of the present disclosure can enable even non-customized software to control a wide variety of target hardware, without requiring extensive customization or configuration on the part of an end user.

As will be appreciated by one of skill in the art in light of the present disclosure, the embodiments disclosed herein provide a technical solution to the technical problem of monitoring and controlling target hardware, such as industrial equipment, that utilizes a wide variety of interfaces and protocols. More specifically, embodiments of the present disclosure enable such target hardware to be monitored and controlled via non-customized software by enabling interactions between the software, as executed on a processor, and the target hardware via configuration of a field-programmable hardware layer. Moreover, embodiments of the present disclosure provide for programmatic creation of templates detailing a configuration of the field-programmable hardware layer, such that deployment and implementation of software on a bridge device does not require end user customization. Thus, the present disclosure represents an improvement on industrial controls systems and computing systems in general.

The foregoing aspects and many of the attendant advantages of this disclosure will become more readily appreciated as the same become better understood by reference to the following description, when taken in conjunction with the accompanying drawings.

Figure 1:
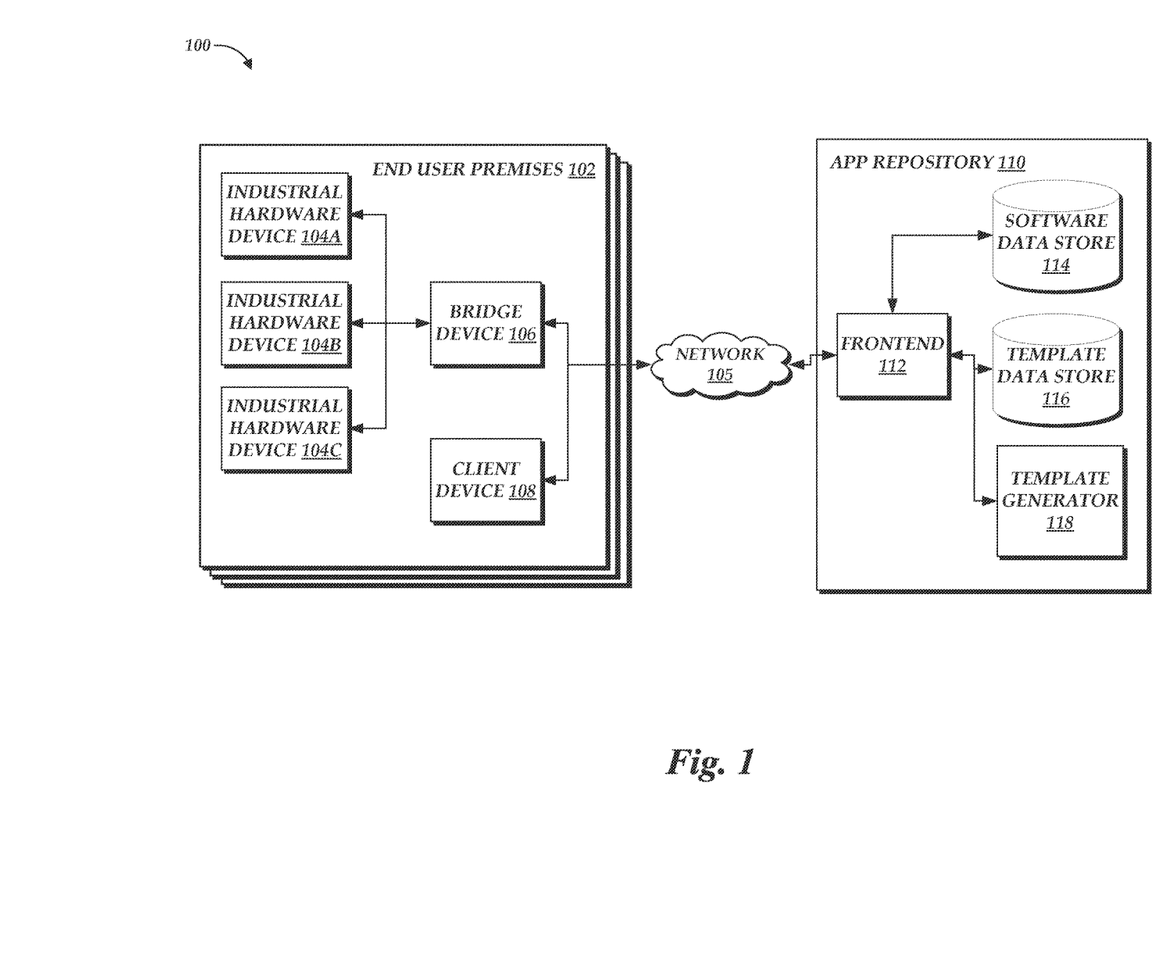
FIG. 1 is a block diagram depicting an illustrative environment in which an app repository can provide software for controlling or monitoring a wide variety of target hardware without requiring customization of the software or execution of other software enabling interaction with the target hardware.

FIG. 1 is a block diagram of an illustrative operating environment 100 for an app repository 110, enabling the provisioning of software applications and corresponding field-programmable hardware templates on bridge devices 106 of end user premises 102 over a network 105.

As shown in FIG. 1, end user premises 102 can include one or more target hardware devices. In the example of FIG. 1, these target hardware devices are industrial hardware devices 104 (shown as devices 104A-C). Industrial hardware devices 104 may correspond, for example, to ovens, hoppers, conveyor belts, pickers, sorters, crushers, shredders, mixers, or the like. In FIG. 1, it is assumed that the industrial hardware devices 104 lack capability to directly communicate with the app repository 110 or other devices on the network 105. For example, each device 104 may be hard-wired to communicate via a specific protocol other than that supported by the network 105, lack a general-purpose processor, be restricted from executing user-specified code, or otherwise lack an ability to communicate on the network 105. While FIG. 1 depicts industrial hardware devices 104, embodiments of the present disclosure may operate with respect to a wide variety of target hardware.

To facilitate interaction with the network 105, or to support general purpose computation with respect to data obtained from industrial hardware devices 104, the end user premises 102 include a bridge device 106. As described herein, a bridge device 106 may include a processor enabling execution of user-specified code, as well as a network communication device enabling communication via the network 105. Accordingly, the bridge device 106 may be capable of general-purpose computation in a manner that industrial hardware devices 104 may not be. Further, to facilitate connection of industrial hardware devices 104 to the network, the bridge device 106 may include a variety of physical input/output ports compatible with input/output ports of industrial hardware devices. The physical input/output ports of the bridge device 106 may be connected to a field-programmable hardware layer, facilitating connection of the input/output ports to other elements of the bridge device. The field-programmable hardware layer may be, for example, an FPGA or a graph processor as disclosed in U.S. Patent App. Publication No. 2016/0239461 entitled "Reconfigurable Graph Processor" (the "'461 Publication"). By enabling network connectivity of inputs and outputs of the industrial hardware device 104, the bridge device 106 can act as a "bridge" between industrial hardware devices 104 and the network 105, providing IoT functionality to such devices 104. In the context of industrial hardware devices 104, this functionality may be referred to as "industrial IoT," or "IIoT" functionality.

In general, the field-programmable hardware layer represents field-programmable hardware; that is, hardware that is logically programmable during operation of the bridge device. For example, the field-programmable hardware layer may include an array of logic blocks (each being, e.g., configurable or fixed), programmable interconnects that allow the logic blocks to be connected in a variety of manners, and input/output (I/O) blocks that enable the field-programmable hardware layer to input and output data. During operation, configurable logic blocks and programmable interconnects can be electronically reconfigured, thus changing a hardware circuit within the field-programmable hardware layer.

While the logic implemented in a configured field-programmable hardware layer may possible to conduct via software of a general-purpose processor, implementation of this logic in hardware can provide numerous benefits. For example, field-programmable hardware layers typically have significantly improved timing, connectivity, parallelism, and bandwidth relative to logic implemented by a general-purpose processor. These advantages may be especially beneficial in the context of industrial hardware devices 104. For example, use of a configured field-programmable hardware layer may ensure that strict timing is maintained with respect to communications with industrial hardware devices 104, which may be required for example based on the protocol supported by the device 104 or to enable real-time requirements for monitoring and/or controlling the devices 104.

In one embodiment, the field-programmable hardware layer may enable standardized communication between industrial hardware devices 104 and software applications executing on the bridge device 106, without requiring customization of either the industrial hardware devices 104 or the software. For example, both a general-purpose processor of the bridge device 106 and the field-programmable hardware layer may be connected to common data storage, such as random-access memory (RAM). Software applications intended for execution on the processor may define a format for input of the software formed from data of industrial hardware devices 104 and outputs of the software intended for delivery to the industrial hardware devices 104. For example, that format may specify data types of those input/outputs. The field-programmable hardware layer may then be configured to obtain data from one or more industrial hardware devices 104, transform the data as required to match the format required by the software, and place that in a specific portion of the common data storage accessible to the general-purpose processor. Similarly, the field-programmable hardware layer may be configured to read data from another specific portion of the common storage, transform the read data as required to match a format required by an industrial hardware device 104, and output that data to the device 104. When the software is executed on the general-purpose processor, the processor may allocate the specific portions of common storage to the software, such that data of the industrial hardware device 104 (placed in the common storage by virtue of operation of the configured field-programmable hardware layer) can be read from the common storage by the software, and similarly such that data written to the common storage by the software is transmitted to the industrial hardware device 104. In this manner, software is not required to directly communicate with industrial hardware devices 104, but can instead read or write to common storage, in a manner that may be more familiar to software developers. In some embodiments, reading or writing to common storage may be further facilitated by software development tools. For example, an administrator of the app repository 110 may provide a software development kit (SDK) or similar development tools that enables a software developer to easily read or write to common storage using standard programming calls.

To configure the field-programmable hardware layer appropriate for a given set of industrial hardware devices 104 and software, the bridge device 106 can be provided with a template for the field-programmable hardware layer, specifying a configuration of the layer appropriate for the software and devices 104. The template may specify, for example, a configuration of blocks and interconnects for the field-programmable hardware layer that routes, and if necessary, transforms I/O from one or more hardware devices 104 to a common storage location on the bridge device 106 accessible to software. The template may illustratively vary according to the number and configuration of industrial hardware devices 104A, as well as based on the software to be implemented on the bridge device 106. For example, where multiple software applications are to be executed on the bridge device 106, each may be associated with a particular location in common storage of the bridge device 106, and the I/O of appropriate hardware devices 104 may be routed to these respective locations via the configuration of the template. This routing provides high flexibility for the bridge device 106. For example, I/O of a single industrial hardware device 104 may be quickly and easily replicated (e.g., via parallelism) in the field-programmable hardware layer to multiple storage locations. As another example, software applications may be easily extended to monitor or control multiple industrial hardware devices 104. Illustratively, an application may interact with an array of data elements in a memory of the bridge device, with each element of the array connected via the field-programmable hardware layer to a different industrial hardware device. In this manner, the software application need not contain instructions to interact with multiple devices, and may simply interact with memory elements, simplifying software development.

While a hardware configuration template is described herein as enabling interaction between software and industrial hardware devices 104, the template may configure a field-programmable hardware layer for additional functions. For example, a field-programmable hardware layer may in some embodiments be used to provide computational functionality to the bridge device, such as conducting matrix multiplication for the purposes of machine learning (ML) applications. A template may therefore device a hardware configuration supporting both interaction between software and industrial hardware devices 104 and these additional functions. The number of industrial hardware devices 104 supported, along with the additional functions, may vary according to the field-programmable hardware layer included within a bridge device 106. For example, more industrial hardware devices 104 or more or faster additional functions may be provided by larger field-programmable hardware layers.

The app repository 110 can enable provisioning of software applications and hardware configuration templates to bridge devices. Specifically, the app repository can include a frontend 112 through which users may browse, search for, and acquire software applications, along with a hardware configuration template appropriate for their industrial hardware devices 104. The software applications provided via the frontend 112 can be stored in a software data store 114, which can correspond to any persistent data store. Illustratively, applications may be provided to the app repository 110 may software developers, via the frontend 112. In addition to the software data store 114, the app repository can include a template data store 116 storing hardware configuration templates for given combinations of software and industrial hardware devices 104. Like the software data store, the template data store 116 can correspond to any persistent data store. Templates within the template data store 116 may be generated via the template generator 118, which can represent hardware, or software executed on hardware, to generate templates. For example, the template generator 118 may represent an FPGA compiler or similar software that generates an FPGA configuration based on parameters including inputs, outputs, and transformations on the FPGA. The inputs and outputs of the FPGA may correspond, for example, to inputs and outputs to industrial hardware devices 104 and software applications to be executed on a bridge device 106. Transformations of the FPGA may correspond to any necessary transformations to bridge these inputs and outputs, such as a format change necessary to accommodate required formats of the applications or industrial hardware devices 104. As noted above, the field-programmable hardware layer may provide additional functions, such as matrix multiplication capabilities, also specified to the compiler. On processing these parameters, the compiler may generate a template for a given configuration.

To utilize the app repository, an end user may utilize a client device 108 to interact with the frontend 112. By way of illustration, various example client devices 108 may include a desktop computer, laptop, and a mobile phone. In general, the client devices 108 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The client device 108 may interact with an interface of the frontend 112 (e.g., a command line interface (CLI), a graphical user interface (GUI), etc.) to specify parameters for a desired template, such as one or more software applications (e.g., selected from a listing of those available in the app repository) desired and the particular industrial hardware devices 104 associated with each software application. The frontend 112 may transform these end user parameters into compiler parameters for the template generator. For example, the frontend 112 may access metadata of each desired software application to identify inputs and outputs of the application. In some embodiments, the frontend 112 may also identify inputs and outputs of each specified hardware device 104, such as by reference to a database on inputs and outputs of such devices 104 maintained at the app repository 110. In other embodiments, the end user may specify inputs and outputs of each device 104 via the client device 108. In some embodiments, additional functions for a field-programmable hardware layer may also be determined by the frontend 112. For example, metadata regarding a software application may specify that the application is enabled to use a given function that can be provided by the field-programmable hardware layer, and the frontend 112 may therefore specify such functionality within compiler parameters. These parameters may then be passed to the template generator 118, which may generate a hardware configuration template for the field-programmable hardware layer. The template is illustratively stored in the template data store 116, and passed based to the bridge device 106 along with the desired software. Thereafter, the template can be implemented on the bridge device 106 such that the software is executed to control operation of the industrial hardware devices 104. The template data store 116 can illustratively be used to satisfy future requests for the same template (e.g., with the same compiler parameters). In some embodiments, the template data store 116 may be omitted, and templates may be passed directly to the bridge device 106 without storage on the app repository.

The app repository 110 depicted in FIG. 1 may illustratively operate in a distributed computing environment including several computer systems that are interconnected using one or more computer networks. The app repository 110 could also operate within a computing environment having a fewer or greater number of devices than are illustrated in FIG. 1. Thus, the depiction of the app repository 110 in FIG. 1 should be taken as illustrative and not limiting to the present disclosure. For example, the app repository 110 or various constituents thereof could be implemented as various Web services components, within hosted or "cloud" computing environments, and/or peer to peer network configurations to implement at least a portion of the processes described herein. Further, the app repository 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
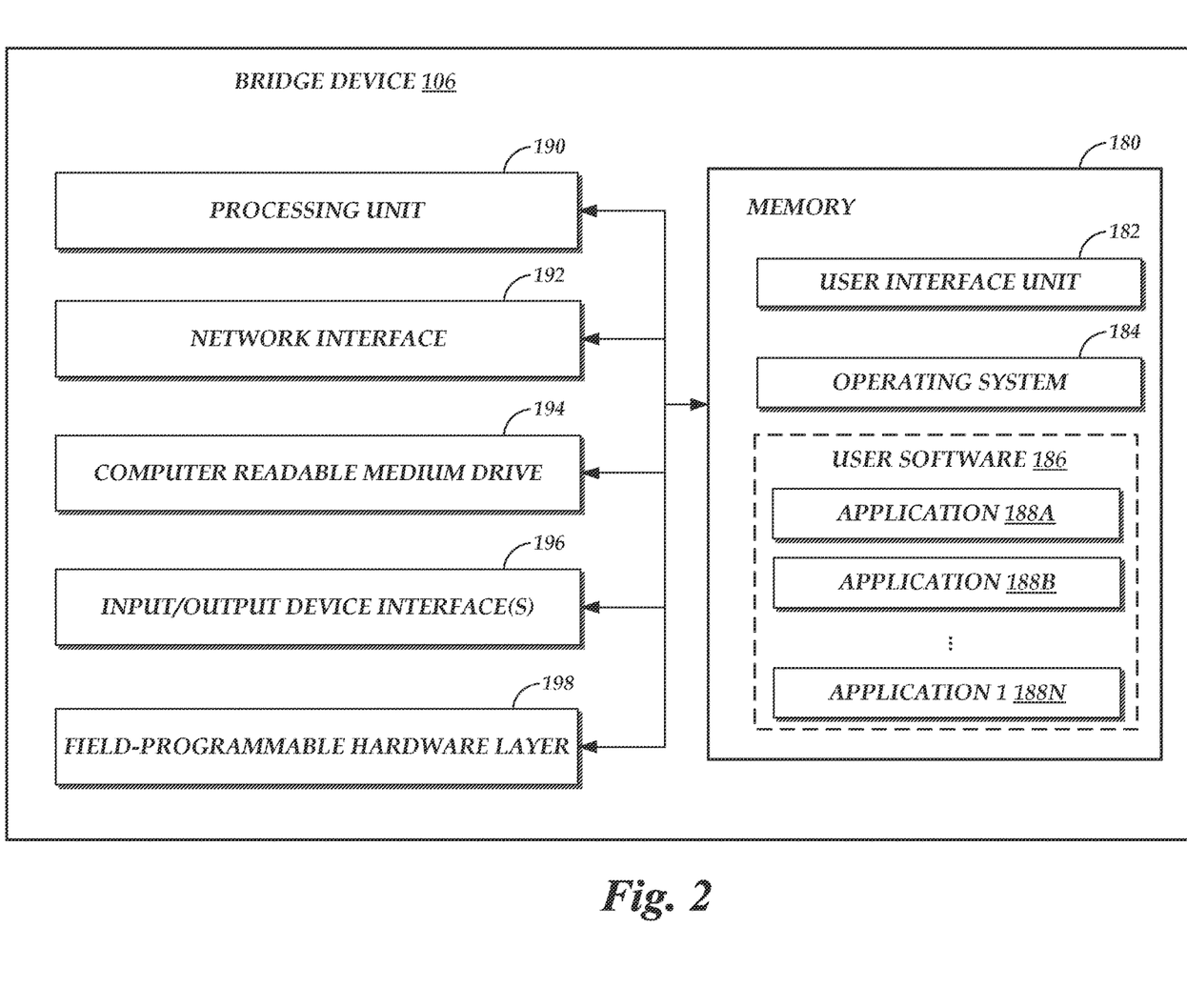
FIG. 2 depicts a general architecture of a bridge device of FIG. 1, including a processor configured to execute software applications and a field-programmable hardware layer configured to route information between the software applications and target hardware.

FIG. 2 depicts a general architecture of a bridge device 106. The general architecture of the bridge device 106 depicted in FIG. 2 includes an arrangement of computer hardware and software modules that may be used to implement aspects of the present disclosure. The hardware modules may be implemented with physical electronic devices, as discussed in greater detail below. The bridge device 106 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the bridge device 106 includes a processing unit 190, a network interface 192, a computer readable medium drive 194, an input/output device interface 196, and a field-programmable hardware layer 198, all of which may communicate with one another by way of a communication bus. The network interface 192 may provide connectivity to one or more networks or computing systems. The processing unit 190 may thus receive information and instructions from other computing systems or services via the network 105. The processing unit 190 may also communicate to and from memory 180 and further provide output information for an optional display (not shown) via the input/output device interfaces 196.

The memory 180 may contain computer program instructions (grouped as modules in some embodiments) that the processing unit 190 executes in order to implement one or more aspects of the present disclosure. The memory 180 generally includes random access memory (RAM), read only memory (ROM) and/or other persistent, auxiliary or non-transitory computer readable media. The memory 180 may store an operating system 184 that provides computer program instructions for use by the processing unit 190 in the general administration and operation of the bridge device 106. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include user software 186, including software applications 188A-188N. For example, the applications 188 may be retrieved and loaded into memory 180 from the app repository 110 of FIG. 1. The applications 188 may provide a variety of functions, such as monitoring and controlling target hardware.

As discussed above, the field-programmable hardware layer 198 may correspond to field-programmable hardware, such as an FPGA, a reconfigurable graph processor, or the like. The field-programmable hardware layer 198 may provide a variety of functions, including enabling interaction between applications 188 and target hardware, such as industrial hardware device 104, via input/output device interfaces 196, which may provide a variety of physical ports or connections to facilitate communication with such hardware. As shown in FIG. 2, the field-programmable hardware layer 198 may be connected via a communication bus to the memory 180, such that the field-programmable hardware layer 198 can read and write values to the memory. A variety of possible communication busses between processing units 190, memory 180, and field-programmable hardware layers 198 are known in the art. For example, these elements may interact via one or more of an Advanced Peripheral Bus (APB), an AMBA High-Performance Bus (AHB), or AMBA Advanced eXtensible Interface (AXI) bus. Accordingly, the field-programmable hardware layer 198 may write data to the memory based on inputs received from target hardware, and read data from memory for output to target hardware. Similarly, the applications 188, when executed by the processing unit 190, may access read and write data to the memory. In one embodiment, particular locations in memory 180 are designated for particular applications 188. Thus, these applications 188 may effectively communicate with target hardware via the memory 180 and operation of the field-programmable hardware layer 198.

Figure 3:
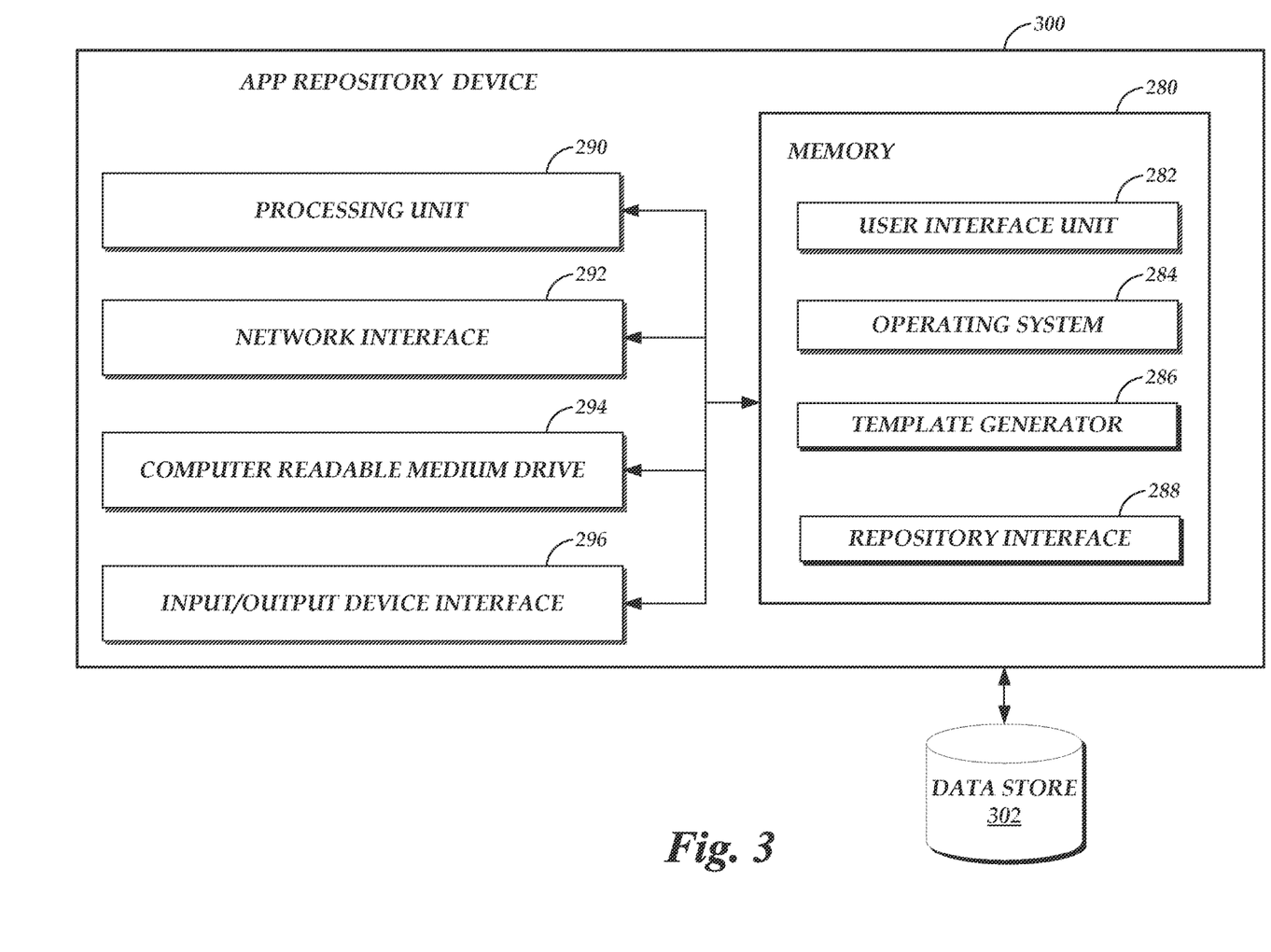
FIG. 3 depicts a general architecture of an app repository device providing the app repository of FIG. 1, enabling end users to acquire software applications for deployment on a bridge device, along with a hardware configuration template that enables a field-programmable hardware layer of the bridge device to route information between software applications executing on the bridge device and target hardware.

FIG. 3 depicts a general architecture of an app repository device 300, which may implement functionalities of the app repository 110 discussed above. The general architecture of the app repository device 300 depicted in FIG. 3 includes an arrangement of computer hardware and software modules that may be used to implement aspects of the present disclosure. The hardware modules may be implemented with physical electronic devices, as discussed in greater detail below. The app repository device 300 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1. As illustrated, the app repository device 300 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 105. The processing unit 290 may also communicate to and from memory 280 and further provide output information for an optional display (not shown) via the input/output device interfaces 296.

The memory 280 may contain computer program instructions (grouped as modules in some embodiments) that the processing unit 290 executes in order to implement one or more aspects of the present disclosure. The memory 280 generally includes random access memory (RAM), read only memory (ROM) and/or other persistent, auxiliary or non-transitory computer readable media. The memory 280 may store an operating system 284 that provides computer program instructions for use by the processing unit 290 in the general administration and operation of the app repository device 300. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition, the memory 280 may include and/or communicate with one or more data stores 302, for example, to access user program codes and/or libraries. For example, the data store 302 may represent the software data store 114 and the template data store 116 of FIG. 1.

In addition to and/or in combination with the user interface unit 282, the memory 280 may include a template generator 286 and a repository interface 288 that individually or collectively implement various aspects of the present disclosure. For example, the template generator 286 can represent code executable to generate a hardware configuration template for a field-programmable hardware layer 198 based on parameters for the layer. For example, the template generator 286 may include an FPGA compiler or similar compiler to generate a hardware configuration template based on compiler parameters. The repository interface 288 can represent code enabling end users (e.g., via client devices 108 of FIG. 1) to browse for software applications, specify target hardware, and receive such applications and a corresponding template enabling interaction between the applications and the target hardware.

Figure 4:
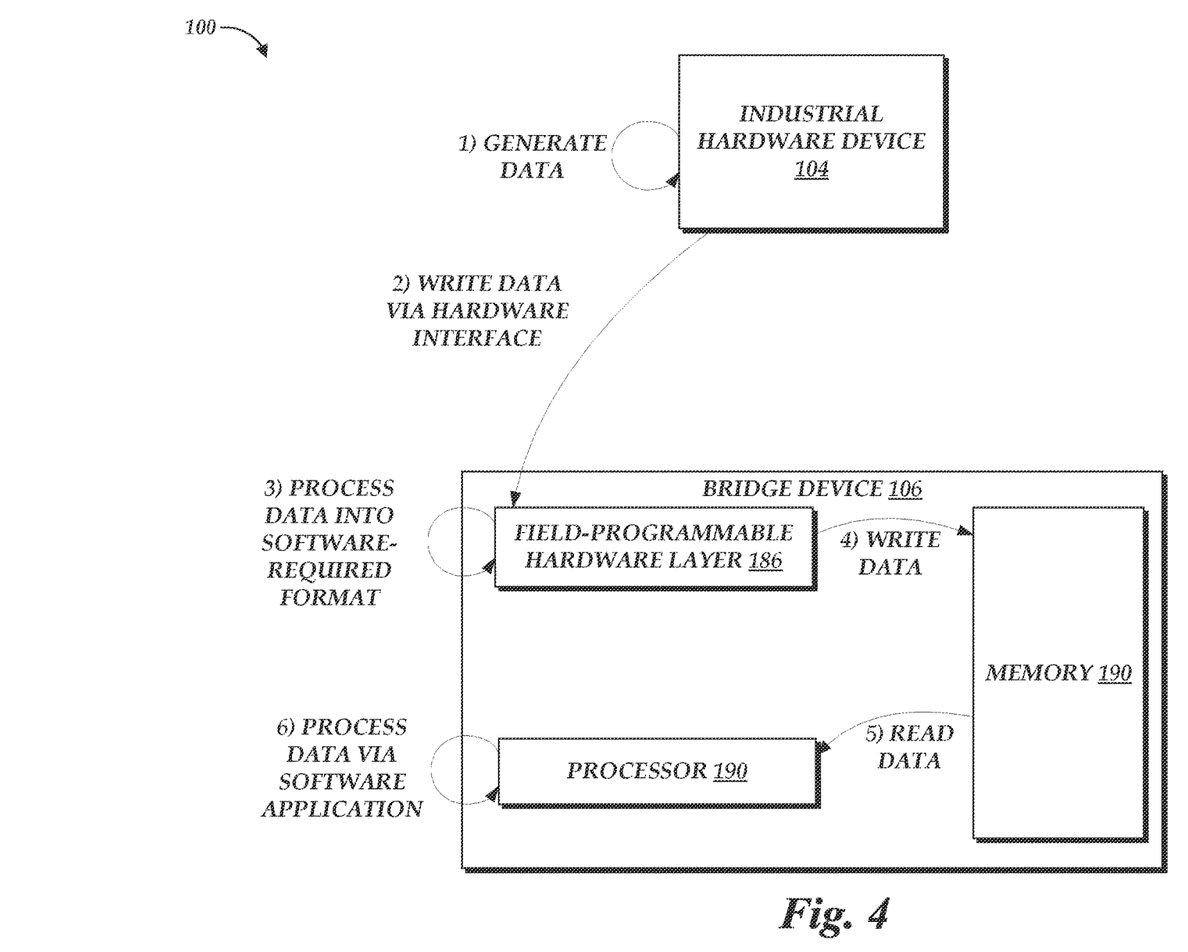
FIGS. 4 and 5 are flow diagrams depicting illustrative interactions for routing information between software applications executing on a bridge device and target hardware by use of a configured field-programmable hardware layer.
Figure 5:
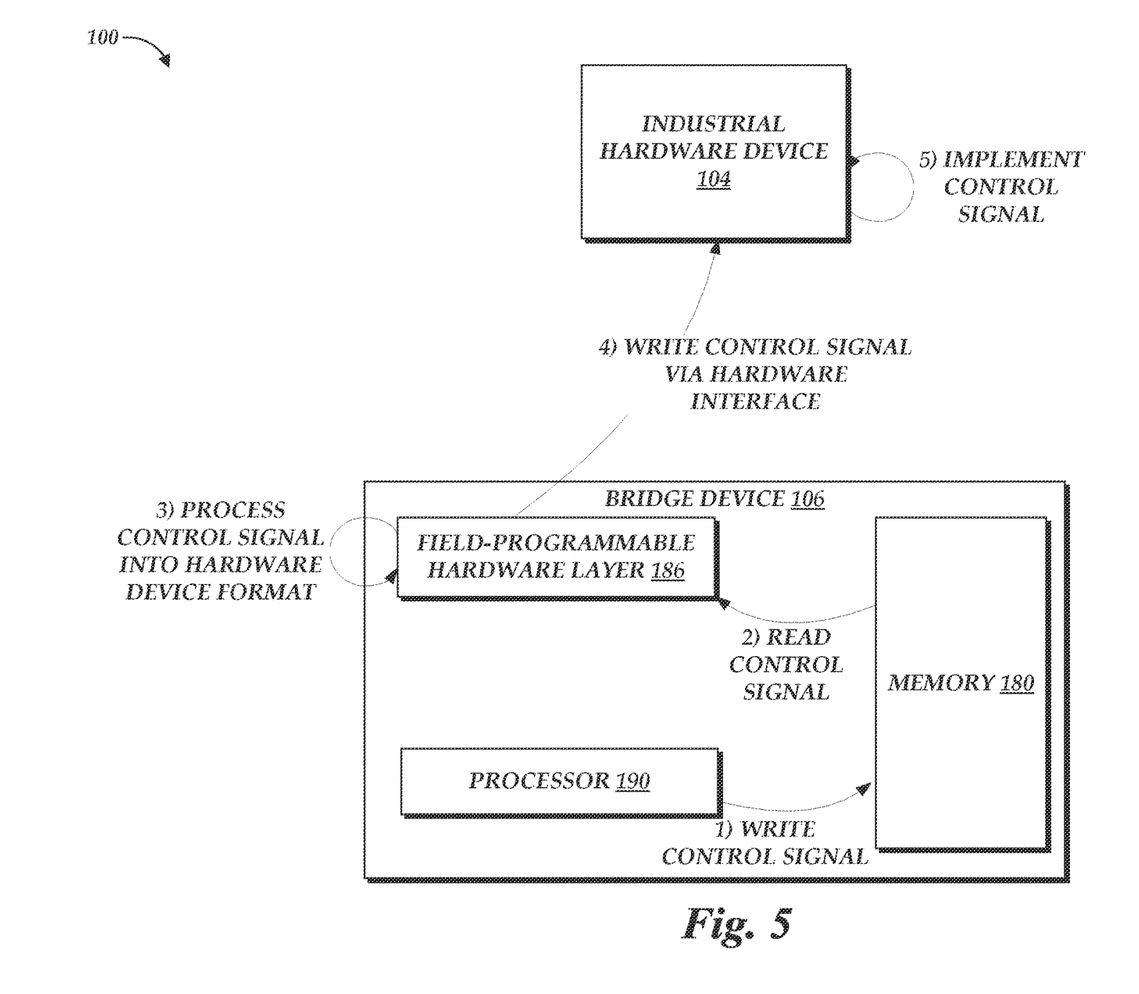

FIGS. 4 and 5 depict illustrative interactions for passing data between an application execution on the processor 190 of FIG. 2 and example target hardware, an industrial hardware device 104. Specifically, FIG. 4 depicts a "read" path for a software application, enabling the software application to read data output by the industrial hardware device 104. For example, the interactions of FIG. 4 may be used to monitor a state of the device 104. FIG. 5 depicts a "write" path for a software application, enabling the application to write data to the industrial hardware device 104. For example, the interactions of FIG. 5 may be used to send control signals to the device 104. Both the read and write paths utilize a field-programmable hardware layer 198 to enable interaction between the software application and industrial hardware device 104 without requiring either to support communication protocols of the other. Thus, these interactions enable non-customized software to interact with a wide variety of target hardware devices. While a single target device (in these figures, an industrial hardware device 104) is shown in FIGS. 4 and 5, similar interactions may occur for any number of devices, subject, e.g., to the connections available on the field-programmable hardware layer 198.

It will be assumed for purposes of description that, in FIGS. 4-5, the field programmable hardware layer 198 is configured to facilitate interactions between the industrial hardware device 104 and software applications executing on the processor 190. Illustratively, the field-programmable hardware layer 198 may be configured by deployment of a hardware configuration template to the device 106, provided along with the software application. Illustrative interactions for deployment of a hardware template are described below with reference to FIG. 6.

The interactions of FIG. 4 begin at (1), where the industrial hardware device 104 generates data. The data may be in any format provided by the device 104: a wide variety of such formats are known in the art. Illustratively, the data provides information regarding the operation of the device 104, such as operating parameters, errors, and the like.

At (2), the data is passed to the bridge device via a hardware interface between the device 104 and the bridge device 106. The hardware interface may vary according to the industrial hardware device 104. For example, the bridge device 106 may include a variety of physical interfaces or ports, to which the device 104 may be connected.

Because the field-programmable hardware layer 198 is configured to facilitate interactions between the device 104 and software executing on the processor 190, the data written by the device 104 is routed to the field programmable hardware layer 198 via I/O blocks of the layer 198. At (3), this data is processed via the hardware of the hardware layer 198. In some embodiments, processing may simply include routing the data to appropriate outputs of the layer 198 to continue the interactions of FIG. 4. In other embodiments, processing may include transforming the data according to requirements of the target software application. For example, where the hardware device 104 provides data in a first bit length and the software expects data in a second bit length, the hardware layer 198 may be configured to include hardware that modifies the bit length of the input data (from the device 104) according to the needs of the software application. A wide variety of other transformations are possible.

At (4), the hardware layer 198 writes the data (as transformed, if appropriate) to the memory 180. For example, the hardware layer 198 can write the data to a particular address within memory 180 associated with the industrial hardware device 104. Because interactions (1)-(4) occur based on the hardware layer 198, these interactions may require little or no resources of the processor 190. Moreover, such operations can occur with increased timing, connectivity, parallelism, and bandwidth requirements due to use of hardware, rather than software executing on the processor 190, to store the data in memory 180.

At (5), the processor 190, via execution of the software application, reads the data from memory 180. For example, the software may include a read instruction that, when executed, reads from the particular address in memory 180 associated with the industrial hardware device 104. Accordingly, at (6), the software application can execute to cause the processor 190 to process the data from the industrial hardware device 104. For example, the application may cause the processor 190 to evaluate the data to determine whether an alert should be created, whether a control signal should be sent, etc. In some embodiments, execution of the software may simply forward the data, such as by writing the data to a network location via the network 105. In other embodiments, execution of the software may cause more complex interactions, such as application of a machine learning model to the data in order to classify the data, predict a result, etc. One skilled in the art will appreciate that a wide variety of functions may be provided by such software applications.

FIG. 5 depicts interactions similar to FIG. 4, but with respect to a write path of a software application. For example, the interactions of FIG. 5 may occur subsequent to those of FIG. 4, when processing by a software application indicates that a control signal is to be sent to an industrial hardware device 104. The interactions of FIG. 5 begin at (1), where the control signal to be sent to the device 104 is written by the processor 190 to memory 180. For example, the control signal may be written to a particular address in memory that is associated with the device 104 via the field-programmable hardware layer 198.

At (2), the field-programmable hardware layer 198 reads the control signal from the memory 180, and, at (3), processes the control signal into a format required by the industrial hardware device 104. Similarly, to as discussed above with respect to FIG. 4, processing may in some instances involve simply routing the signal. In other instances, processing may include transforming the signal, such as by modifying a format of data representing the signal.

Thereafter, at interaction (4), the signal is written to the industrial hardware device 104 via a hardware interface between the device 104 and the field-programmable hardware layer 198. The device 104 can then implement the control signal, at (5), to modify operation of the device 104 according to the signal. Accordingly, a software application execution on the processor 190 may control operation of the device 104 without requiring specific customization of the software.

While FIGS. 4 and 5 are described linearly, interactions may be non-linear in practice. For example, data transmission between a hardware device 104 and memory 180 may operate at a first speed or frequency according to characteristics of the device 104, the memory 180, and the field-programmable hardware layer 198. Interactions between a software application executing on the processor 190 and the memory 180 may operate at a second speed or frequency according, e.g., to operation of the processor 190. Notably, this decouples the need for synchronization between software and the industrial hardware device 104. For example, slowdowns in operation of the processor 190 (e.g., due to overloading) need not effect collection or writing of data to and from the device 104.

Figure 6:
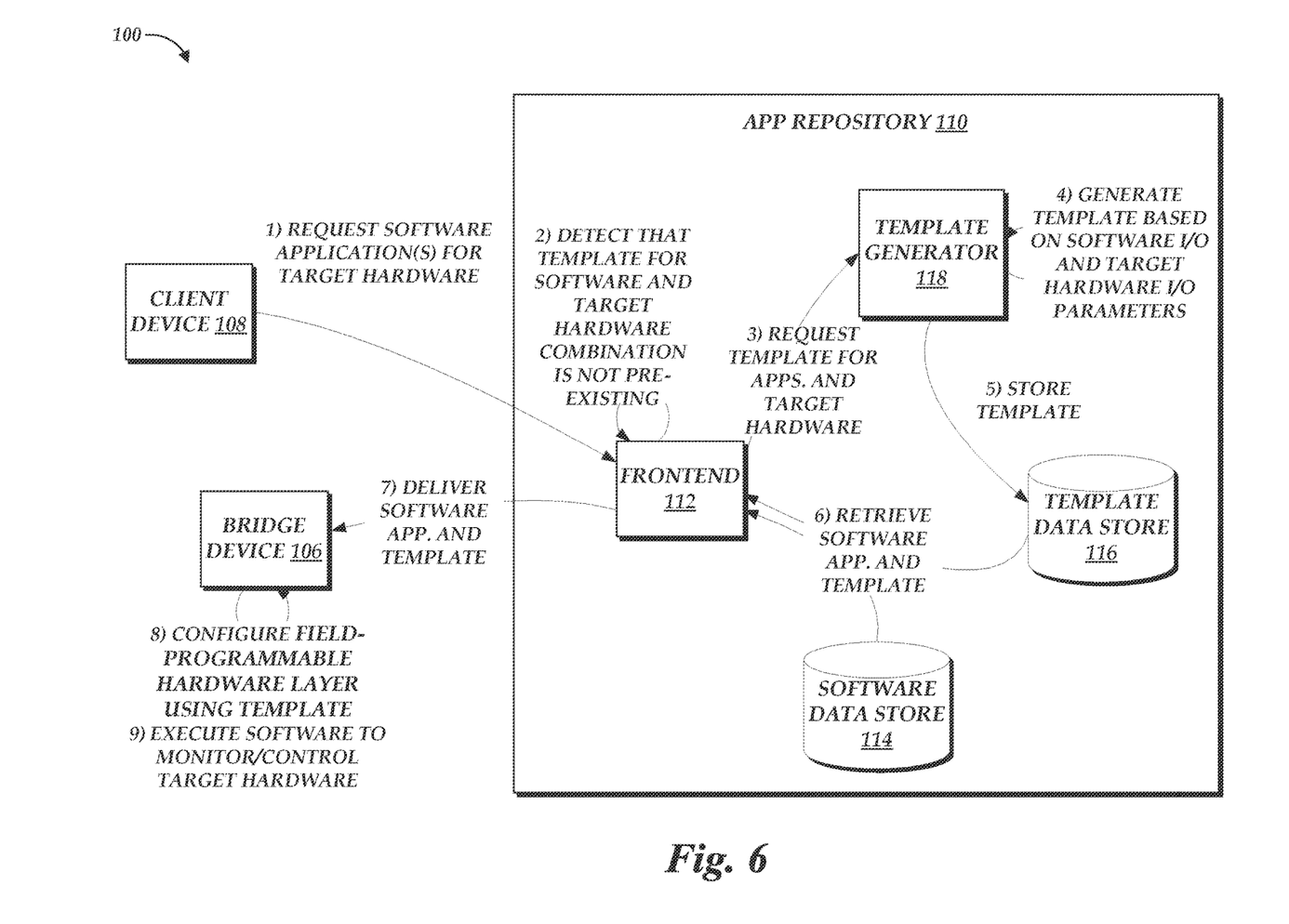
FIG. 6 is a flow diagram depicting illustrative interactions for deploying software applications from an app repository to a bridge device, along with a hardware configuration template providing a configuration of a field-programmable hardware layer to route information between software applications executing on a bridge device and target hardware.

With reference to FIG. 6, illustrative interactions will be described for provisioning a bridge device 106 with one or more software applications to control or monitor target hardware, such as industrial hardware devices 104, along with hardware, provided by a field-programmable hardware layer configured according a hardware configuration template, that facilitates interaction between the software applications and the target hardware. As shown in FIG. 6, the software applications and hardware configuration template can be provided to the bridge device 106 by an app repository 110.

The interactions of FIG. 6 begin at (1), where an end user, using a client device 108, requests one or more software applications for target hardware. For example, the end user may browse the app repository 110 to select available applications and request that they be provisioned to a bridge device 106. The end user may further specify target hardware to be controlled or monitored by the software applications, such as by type, make, model, communication protocol, or the like.

At (2), the frontend 112 detects that a hardware configuration template for the combination of target hardware and software applications is not pre-existing on the app repository 110. For the purposes of description of FIG. 6, it is assumed that such a template is not pre-existing. In the instance that such a template was pre-existing (e.g., on a second or subsequent request for the one or more software applications and the target hardware), the frontend 112 may immediately return that template and corresponding software, as discussed at interaction (7), below.

At (3), the frontend 112 therefore requests that the template generator 118 generate a template for the applications and target hardware. The template generator 118, at (4), then generates the hardware configuration template based on various parameters, including inputs and outputs of the software applications and inputs and outputs of the target hardware. As discussed above, the template generator may, for example, generate a configuration of hardware such that a field-programmable hardware layer accepts inputs and provides outputs to each target hardware, in a manner and format accepted by the target hardware. The configuration of hardware may further include routing such that inputs from target hardware are communicated to a common storage location, such as RAM, accessible to the software applications. Similarly, the configuration of hardware can include routing such that outputs of the software written to the common storage are communicated to the target hardware. The configuration of hardware may further specify modifications or transformations of data during routing, such as modification of a format of the data, logical manipulation of the data, etc. The configuration illustratively includes a route between each combination of software application deployed on the bridge device 106 and target hardware controlled or monitored by such application. As noted above, in some embodiments a field-programmable hardware layer may be used for other functions, such as conducting matrix multiplication in support of machine learning applications. The parameters for the template may therefore include specification of such functions, and the resulting template may include, for example, a hardware layout support such functions. The template generator 118 then, at (5), stores the template in the template data store 116.

After creation of the template, the frontend 112 can then at (6) retrieve the template and software applications from the respective data stores 114 and 116. The frontend 112 further, at (7), delivers the template and software applications to the bridge device 106.

At (8), the bridge device configures a field-programmable hardware layer within the device according to the hardware configuration template, such that hardware is created on the device 106 that implements the routing, transformations, and additional functions specified within the template. Accordingly, the device 106 is configured to accept input from and write output to target hardware connected to the device 106 via the field-programmable hardware layer. Thereafter, at (9), the device 106 can execute the software applications (e.g., via a general-purpose processor) to monitor and control such target hardware by reading and writing data from a common storage location, such as memory of the device 106. Accordingly, such software need not be customized to the target hardware, but can rather function simply by reading or writing to memory. Moreover, the bridge device 106 may not be required to include other software facilitating interaction with target hardware, simplifying development and increasing resiliency of operation. Accordingly, development and deployment of software to control and monitor target hardware is greatly simplified.

Figure 7:
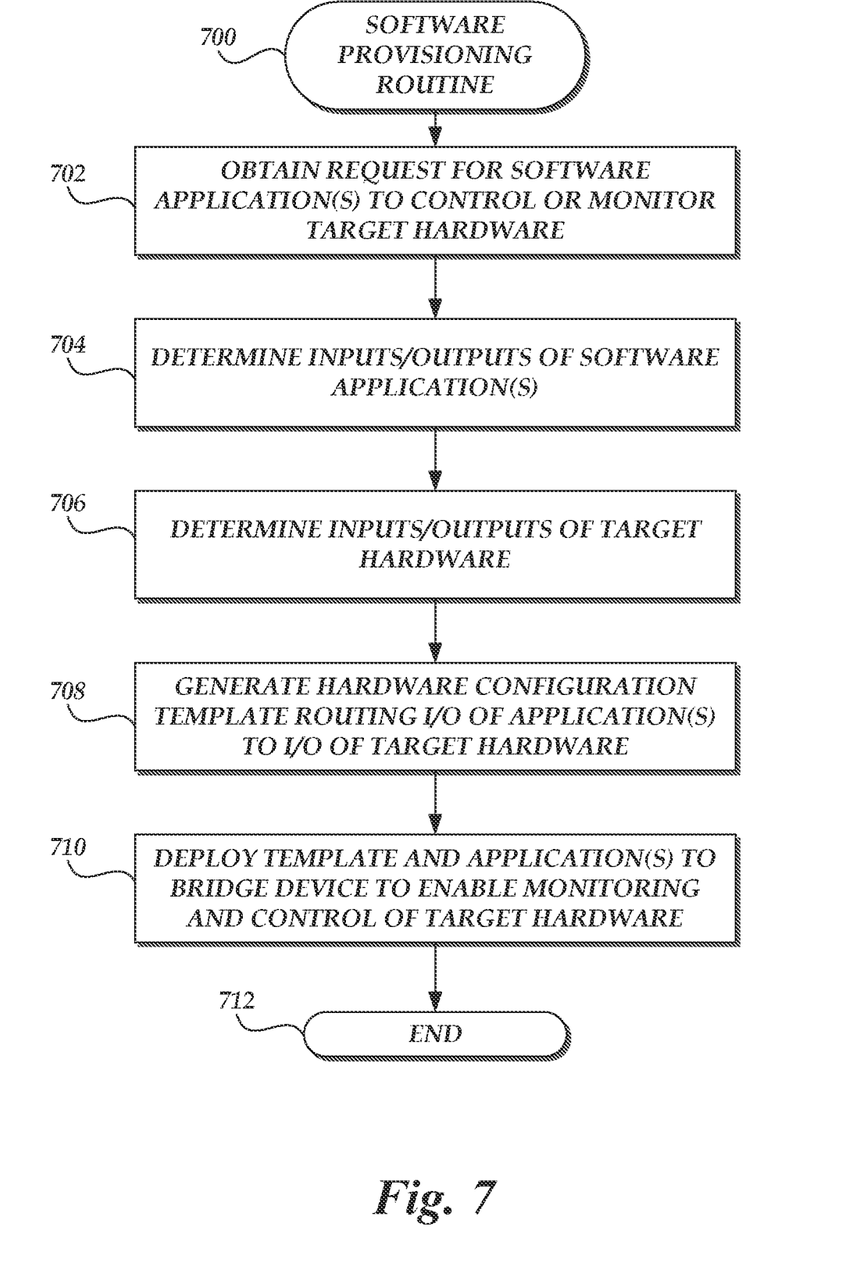
FIG. 7 is an illustrative routine for provisioning a bridge device with software, along with a hardware configuration template providing a configuration of a field-programmable hardware layer to route information between software applications executing on a bridge device and target hardware.

With reference to FIG. 7, an illustrative routine 700 will be described for provisioning a bridge device with software to control or monitor target hardware. The routine 700 may be implemented, for example, by app repository 110 of FIG. 1.

The routine 700 begins at block 702, where the app repository 110 obtains a request for one or more software applications to control or monitor target hardware. The request may specify, for example, the applications and the target hardware (e.g., via make, model, protocol, I/O ports, etc., of the target hardware). For example, an end user, using a client device 108, may interact with a frontend 112 of the app repository to select software to control one or more industrial hardware devices 104.

At block 704, the app repository 110 determines inputs and outputs of the software application. The repository 110 may illustratively maintain, for each application, metadata indicating inputs and outputs of the application, such as a number of inputs and outputs, data type of each input and output, and the like. For example, a monitoring application for industrial ovens may accept as input one or more specific bit-length values from such ovens, each value specifying, for example, an operating temperate of an oven. As another example, a control application for may output control signals in a particular format or protocol, specifying, e.g., timing, bit length, required fields, valid field values, etc. The repository 110 may thus determine the particular inputs and outputs of each application, in order to properly route those inputs and outputs to target hardware.

In addition, at block 706, the app repository 110 determines inputs and outputs of the target hardware. In one embodiment, the end user may specify these inputs and outputs along with the request. In another embodiment, the end user may specify characteristics of the target hardware, from which the repository 110 may determine inputs and outputs (e.g., based on mapping information maintained at the repository 110). The inputs and outputs may illustratively be determined based on the inputs and outputs of the requested software. For example, where the requested software provides a control signal, the repository 110 can determine whether target hardware accepts, as input, the control signal or another compatible signal. Where requested software accepts monitoring information as input, the repository can determine whether the target hardware provides as output that monitoring information or other compatible information.

At block 708, the app repository 110 generates a hardware configuration template for a field-programmable hardware layer that routes the inputs and outputs of the target hardware to locations in memory of a bridge device accessible to the requested software applications, when the applications are executed on the bridge device. The routing may generally map inputs of software to outputs of one or more target devices, and vice versa. In some embodiments, the routing may also conduct transformations on data, such as testing the data for validity, altering a format of the data, etc. As discussed above, in some embodiments the field-programmable hardware layer may be used for additional functionalities of the software applications, which may also affect the template. For example, the template may specify that portions of a field-programmable hardware layer are to be configured for use in conducting matrix multiplication (e.g., as a systolic array or similar configuration).

At block 710, the app repository 110 deploys the template and requested software applications to the bridge device. The bridge device can then implement the template by configuring a field-programmable hardware layer according to the template, to route data between target hardware devices connected to the bridge device and memory of the bridge device. The bridge device can then execute the software applications, which may monitor or control the target hardware devices by interaction with the memory. Accordingly, the software need not be customized to the particular target hardware, and a given software application may be deployed without modification to control a wide variety of different target hardware devices. The routine 700 then ends at block 712.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for monitoring and controlling industrial hardware devices via non-customized software applications, the system comprising:
   a data store storing one or more software applications, each software application representing code executable to control or monitor industrial hardware devices; and
   one or more processors configured with instructions that, when executed, cause the system to:
      obtain a request from an end user for the one or more software applications, the request specifying a target industrial hardware device to be controlled or monitored by the one or more software applications;
      generate a hardware configuration template specifying a configuration of a field-programmable hardware layer on a bridge device of the end user, the configuration including a routing, on the field-programmable hardware layer, of inputs and outputs of the target industrial hardware device to corresponding locations in a memory of the bridge device accessible to a processor of the bridge device configured to execute the one or more software applications; and transmit the one or more software applications and the hardware configuration template to the bridge device, wherein the bridge device is configured to:
modify the field-programmable hardware layer according to the hardware configuration template to implement the routing of inputs and outputs of the target industrial hardware device to corresponding locations in the memory of the bridge device accessible to the processor of the bridge device; and
execute the one or more software applications on the processor, wherein executing the one or more software applications enables the one or more software applications to monitor or control the target industrial hardware device by reading and writing to the locations in the memory of the bridge device.

2. The system of claim 1, wherein the field-programmable hardware layer is at least one of a field programmable hardware array (FPGA) or a reconfigurable graph processor.

3. The system of claim 1, wherein the instructions, when executed, further cause the system to provide an interface to a computing device of the end user enabling browsing of and selection of the one or more software applications.

4. The system of claim 1, wherein executing the one or more software applications further implements a machine learning algorithm on the bridge device.

5. The system of claim 4, wherein the hardware configuration template further configures the field-programmable hardware layer to conduct matrix multiplication operations supporting the machine learning algorithm.

6. The system of claim 1, wherein the data store further comprises metadata defining the inputs and outputs of the target industrial hardware device.

7. The system of claim 1, wherein the data store further comprises metadata defining inputs and outputs of the one or more software applications.

8. The system of claim 1, wherein the configuration of the field-programmable hardware layer further specifies a transformation of data, via the field-programmable hardware layer, between a format of the data provided by the target industrial hardware device and a format of data required by the one or more software applications.

9. The system of claim 1, wherein the configuration of the field-programmable hardware layer further specifies a transformation, via the field-programmable hardware layer, of data provided by at least one of the target industrial hardware device or the one or more software applications during routing of the data.

10. The system of claim 1, wherein the configuration of the field-programmable hardware layer further specifies the locations in memory of the bridge device.

11. The system of claim 1, wherein the one or more software applications are configured to read from or write to the locations in the memory of the bridge device at a first rate, and wherein the target industrial hardware device is configured to provide data via at least one of the inputs and outputs of the target industrial hardware device at a second rate different than the first rate.

12. The system of claim 1, wherein the instructions further cause the system to:
store the hardware configuration template;
obtain a second request from a second end user for the one or more software applications, the second request specifying the target industrial hardware device; and
transmit the stored hardware configuration template to the second end user in response to the second request.

13. A computer-implemented method comprising:
obtaining a request from an end user for one or more software applications representing code executable to control or monitor a target industrial hardware device, the request specifying the target industrial hardware device to be controlled or monitored by the one or more software applications;
generating a hardware configuration template specifying a configuration of a field-programmable hardware layer on a bridge device of the end user, the configuration including a routing, on the field-programmable hardware layer, of inputs and outputs of the target industrial hardware device to corresponding locations in a memory of the bridge device accessible to a processor of the bridge device configured to execute the one or more software applications; and
transmitting the one or more software applications and the hardware configuration template to the bridge device, wherein the bridge device is configured to:
modify the field-programmable hardware layer according to the hardware configuration template to implement the routing of inputs and outputs of the target industrial hardware device to corresponding locations in the memory of the bridge device accessible to the processor of the bridge device; and
execute the one or more software applications on the processor, wherein executing the one or more software applications enables the one or more software applications to monitor or control the target industrial hardware device by reading and writing to the locations in the memory of the bridge device.

14. The computer-implemented method of claim 13 further comprising providing an interface to a computing device of the end user enabling browsing of and selection of the one or more software applications.

15. The computer-implemented method of claim 13, wherein executing the one or more software applications further implements a machine learning algorithm on the bridge device.

16. The computer-implemented method of claim 15, wherein the hardware configuration template further configures the field-programmable hardware layer to conduct matrix multiplication operations supporting the machine learning algorithm.

17. One or more non-transitory computer-readable media comprising computer-executable instructions that, when executed by a computing system, cause the computing system to:
obtain a request from an end user for one or more software applications representing code executable to control or monitor a target industrial hardware device, the request specifying the target industrial hardware device to be controlled or monitored by the one or more software applications;
generate a hardware configuration template specifying a configuration of a field-programmable hardware layer on a bridge device of the end user, the configuration including a routing, on the field-programmable hardware layer, of inputs and outputs of the target industrial hardware device to corresponding locations in a memory of the bridge device accessible to a processor of the bridge device configured to execute the one or more software applications; and
transmit the one or more software applications and the hardware configuration template to the bridge device, wherein the bridge device is configured to:

modify the field-programmable hardware layer according to the hardware configuration template to implement the routing of inputs and outputs of the target industrial hardware device to corresponding locations in the memory of the bridge device accessible to the processor of the bridge device; and execute the one or more software applications on the processor, wherein executing the one or more software applications enables the one or more software applications to monitor or control the target industrial hardware device by reading and writing to the locations in the memory of the bridge device.

18. The one or more non-transitory computer-readable media of claim 17, wherein the configuration of the field-programmable hardware layer further specifies a transformation of data, via the field-programmable hardware layer, between a format of the data provided by the target industrial hardware device and a format of data required by the one or more software applications.

19. The one or more non-transitory computer-readable media of claim 17, wherein the configuration of the field-programmable hardware layer further specifies a transformation, via the field-programmable hardware layer, of data provided by at least one of the target industrial hardware device or the one or more software applications during routing of the data.

20. The one or more non-transitory computer-readable media of claim 17, wherein the configuration of the field-programmable hardware layer further specifies the locations in memory of the bridge device.

* * * * *